UNITED STATES PATENT OFFICE.

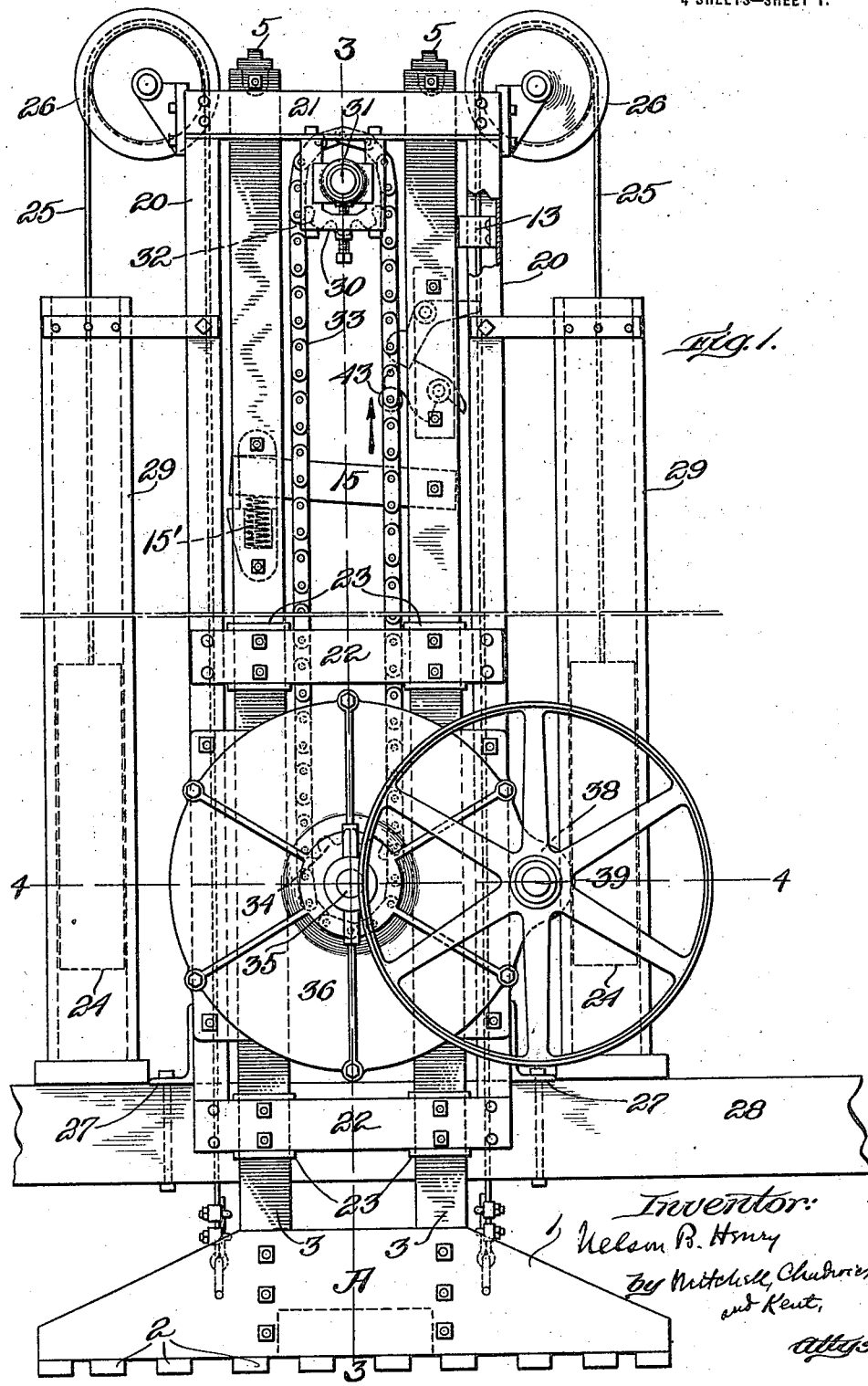

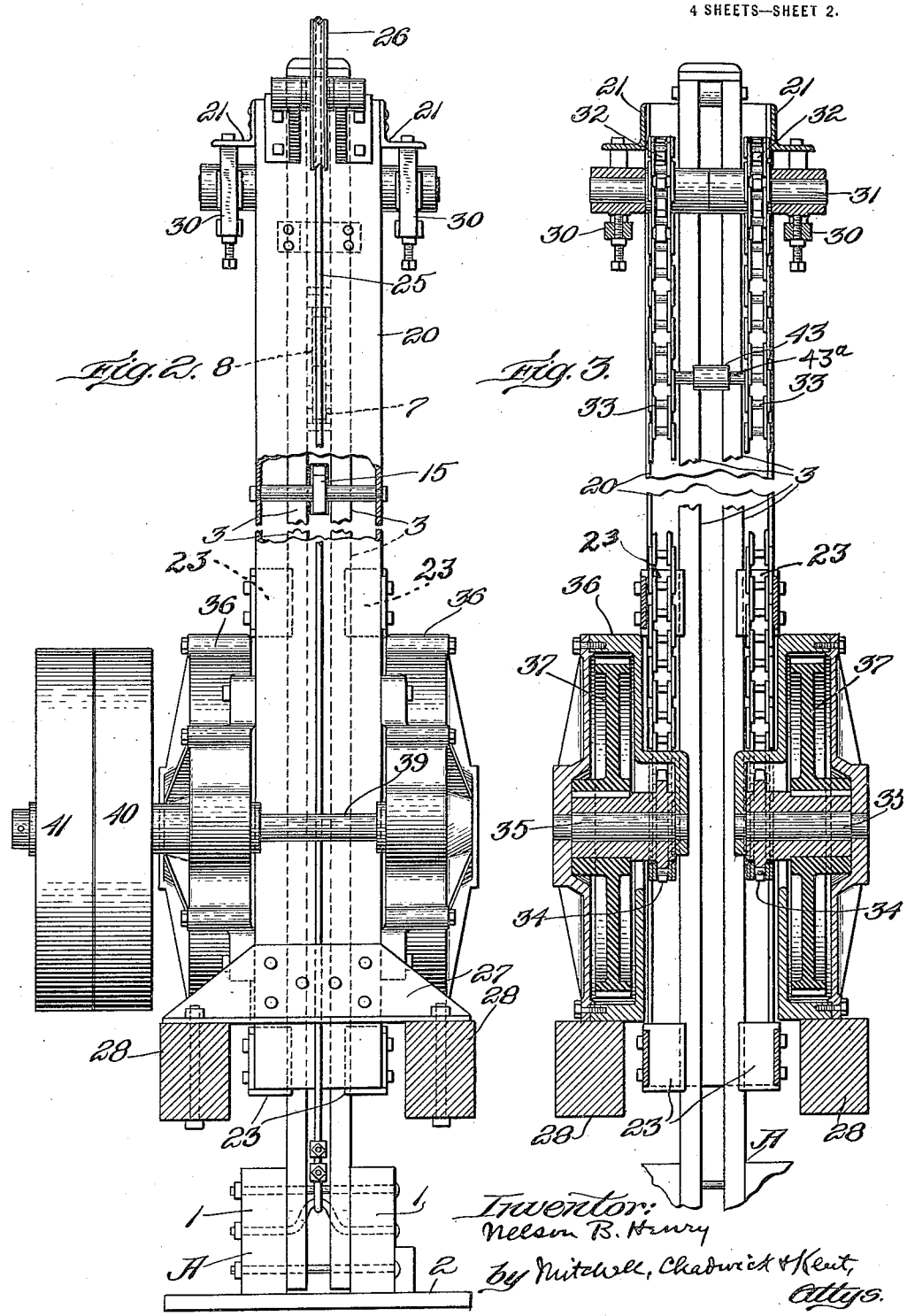

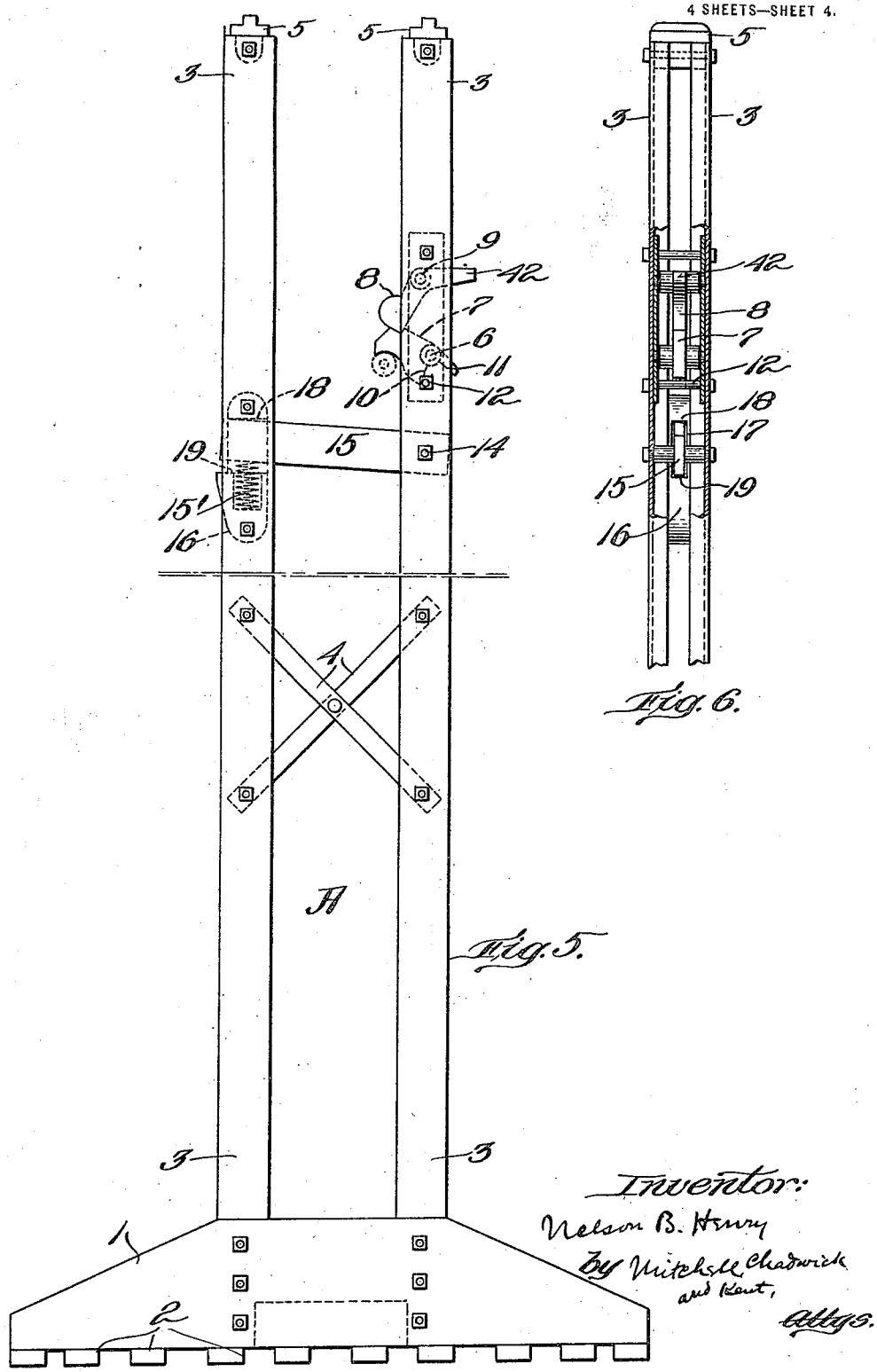

NELSON B. HENRY, OF ATLANTA, GEORGIA, ASSIGNOR TO THE MURRAY COMPANY, OF DALLAS, TEXAS, A CORPORATION OF TEXAS.

TRAMPER FOR COTTON PRESSES.

1,402,357. Specification of Letters Patent. Patented Jan. 3, 1922.

Application filed July 9, 1920. Serial No. 394,925.

*To all whom it may concern:*

Be it known that I, NELSON B. HENRY, a citizen of the United States, residing at Atlanta, in the county of Fulton and State of Georgia, have invented certain new and useful Improvements in Trampers for Cotton Presses, of which the following is a specification.

My invention relates to cotton baling apparatus and particularly to "trampers," so called, such as are employed in gin outfits to tramp or pack the loose lint as it is fed into the baling box of a cotton baling press in order to compact the same more or less within said box preparatory to its compression into a bale by the press.

Trampers for cotton presses comprise a power operated reciprocating plunger movable into and out of the baling box, a charge of loose lint being fed into the baling box each time the plunger is withdrawn from the latter, and each charge of lint delivered into the box being initially compacted to a relatively small degree by the plunger when the latter is moved forward into the baling box. One type of cotton press tramper heretofore provided has required the constant attention and services of an operator to manually control the movements of the plunger into and out of the baling box, which was objectionable. Other types of trampers heretofore provided have been so constructed that the reciprocating movements of the plunger into and out of the baling box were automatically controlled, and while these forms did not require the constant attention and service of an operator they were objectionable for the reason that their construction and mode of operation required the provision of automatic means, operating in timed relation to the movements of the plunger, for positively and quickly transferring a charge of lint to the baling box each time the plunger was withdrawn from the latter, with the result that automatic trampers of this kind as heretofore constructed have been objectionably complicated as well as expensive to build.

My invention has for its object to improve the construction and mode of operation of trampers for cotton presses and particularly to provide an automatically operating tramper which will not require the use in conjunction therewith of automatic lint feeding mechanism such as just referred to.

To these ends my invention consists of a tramper for cotton presses having the features of construction and mode of operation set forth in the following description and particularly pointed out and defined in the claims at the close thereof, it being understood, however, that I do not limit my invention to the specific embodiment thereof herein shown and described.

In the accompanying drawings:

Figure 1 is a front elevation of a tramper for cotton presses constructed in accordance with my invention.

Figure 2 is a side elevation, partly broken away, of the tramper shown in Fig. 1.

Figure 3 is a section on line 3—3 of Fig. 1.

Figure 5 is a front elevation of the plunger hereinafter referred to.

Figure 6 is a side view, partly broken away and in section of the upper portion of the plunger shown in Fig. 5.

Figure 4:
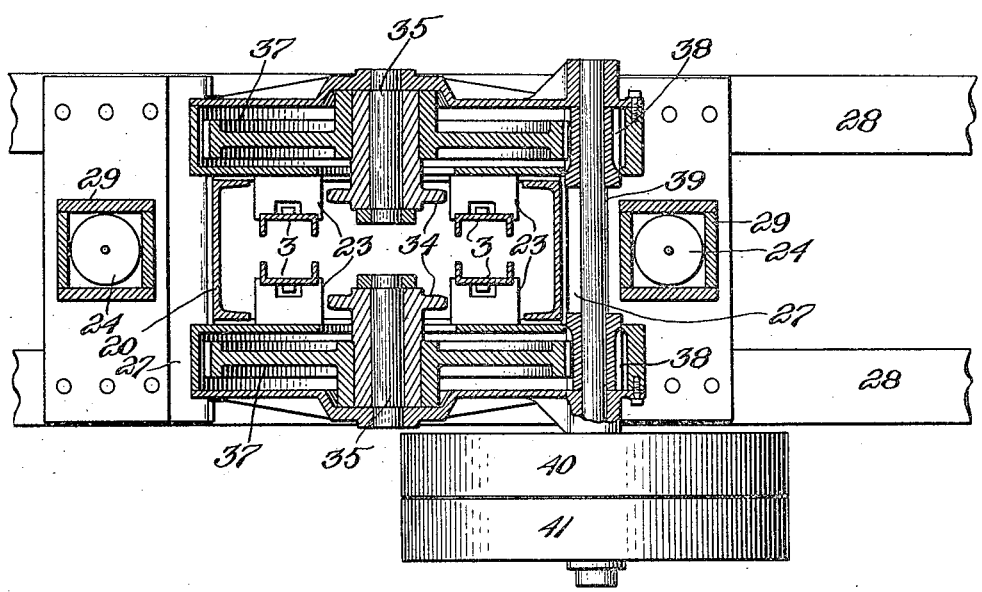
Figure 4 is a section on line 4—4 of Fig. 1.

The plunger A of my improved tramper, see Figs. 5 and 6, is made with a head consisting of a pair of blocks 1, 1, to the under sides of which are fastened a plurality of slats, 2. The blocks 1, 1, of head A are bolted to the lower ends of four vertical channel iron bars, 3, which constitute the stem or shank of the plunger. The bars 3 are arranged in two pairs and are connected intermediate their ends by struts 4 which hold the two pairs of bars rigidly parallel. At their upper ends the two bars 3 of each pair are connected and held in position relatively, by a cap 5, bolted to said bars.

Pivotally mounted at 6 between the bars 3 of one of said pairs is a dog 7 which co-operates with the chain, presently to be referred to, and with a latch 8, the latter being pivotally mounted at 9 between the bars 3 of said pair, immediately above dog 7. The inner arm of latch 8 is weighted so that it normally tends to engage the dog 7, while the latter is made with stop shoulders 10 and 11 that engage a bolt 12 to limit the movement of dog 7 on its pivot 6. The other outer arm of latch 8 extends laterally beyond the stem of the plunger to co-operate with a latch tripping abutment 13, Fig. 1, provided on the frame of the machine.

Mounted upon the stem of the plunger A, a short distance below the dog 7, is a transversely disposed abutment bar 15, one end of which is disposed between one pair of bars 3 and is pivotally connected therewith by means of a bolt 14, while the opposite end thereof occupies a position between the other pair of bars 3 and is yieldingly supported by a shock absorbing spring, $15^1$. The spring $15^1$ is mounted within a pocket provided in a bracket 16 fastened by bolts to said bars 3. This bracket 16 is made with a slot 17 that is occupied by the end of abutment bar 15, the ends 18 and 19 of said slot serving as stops to limit the swing of bar 15 in both directions.

The frame of the tramper includes a pair of upright channel irons 20 connected together by transverse bars 21 and 22 riveted or otherwise secured at their ends to the channel irons. Bolted in position upon the inner sides of the transverse bars 22 are guide blocks 23 within which the bars 3, constituting the stem of the plunger A, are mounted to slide vertically. Weights 24, connected by cables 25 with the head of the plunger A, counterbalance the weight of said plunger and support the latter against gravity, said cables extending upwardly from the weights 24 and over sheaves 26 at the upper end of the frame from which sheaves they pass downwardly through the channel irons 20 to the head of the plunger A.

Near their lower ends the channel irons 20 have angle irons 27 riveted thereto which rest upon and are bolted to a pair of sills 28 by means of which the tramper is supported in position directly over the bale box (not shown) so that when the plunger A is moved vertically in the guide blocks 23 it is carried into and out of said box. The weights 24 are preferably arranged within tubular housings 29 mounted at their lower ends upon the sills 28.

The transverse bars 21 which connect the upper ends of the channel irons 20 are angle irons, each having a horizontal disposed flange to the under side of which is bolted a hanger 30, said two hangers supporting a shaft 31 having fixed thereon two sprocket wheels 32. Around each sprocket wheel 32 passes an endless chain 33 which extends downwardly around another sprocket wheel 34. The two lower sprocket wheels 34 are loosely mounted upon two axially aligned studs 35 mounted in housings 36 bolted to the outer sides of the upright channel irons 20, the inner ends of the studs 35 being separated as shown in Fig. 3 so as to leave between them a passageway for the abutment bar 15 which occupies a position between the two chains 33 and moves vertically with the plunger A back and forth past the studs 35 when the tramper is in operation. The hub of each sprocket 34 has secured upon it a gear 37 driven by a pinion 38, the two pinions 38 being fast on a shaft 39 that is continuously driven by a belt, not shown, engaging a pulley 40 fast on said shaft.

Alongside of the fixed pulley 40 is provided a loose pulley 41 onto which the belt can be shifted when it is desired to stop the machine.

The two chains 33 are connected by a single long pintle $43^a$ upon which is mounted a roller 43, and when the machine is operating this roller is travelling continuously in the endless path of the chain in the direction indicated by the arrow in Fig. 1.

During the upward movement thereof roller 43 engages the dog 7 and through the latter acts to lift the plunger, the latch 8 serving to hold the dog against swinging upwardly upon its pivot 6 until the outwardly projecting arm 42 of said latch strikes the tripping abutment 13. The latch is then swung out of engagement with dog 7 thus disconnecting the plunger from the travelling chains and allowing the roller 43 to pass beyond said dog leaving the plunger supported in its uppermost position by the weights 24. When latch 8 is thus tripped to effect the disengagement of the dog 7 and roller 43, the latter continues upwardly around the sprockets 32 from which latter it passes downwardly into engagement with the bar 15 through which it now acts to push the plunger into the baling box. As soon as the plunger starts to descend the latch 8 falls by gravity into position behind dog 7 again.

The plunger A is moved downwardly by the endless chains through the engagement of roller 43 with bar 15, as described above, until roller 43 passes under the lower sprocket wheels 34. In passing around the lower sprocket wheels 34 the roller 43 leaves the bar 15 and again picks up the dog 7 through which it acts to raise the plunger until the latch 8 again engages the latch tripping abutment 13.

Thus the plunger actuating chains 33, 33, which are continuously in motion act, through the means described, to automatically and intermittently reciprocate the plunger, each period of rest of the latter occurring at the completion of the upward or outward stroke thereof, while the roller 43 is travelling from dog 7 to bar 15. This is a feature of my invention for the reason that the plunger is caused to remain at rest for a period of time while out of the baling box, without stopping the continuous operation of the actuating means for the plunger. This period of rest of the plunger while at the limit of its outward movement allows time for the lint cotton to slide by gravity or otherwise into the bale box and dispense with the necessity of special means to feed the cotton lint into the box during a comparatively short interval of time as has heretofore been required with automatically controlled and operated plungers. When auxiliary means such as spiked rollers, movable fingers or travelling aprons are used to put the lint cotton into the bale box they have a bad effect on the bat and in some instances materially affect the appearance of the cotton sample.

Theoretically, there should be a slight pause in the movement of the plunger while roller 43 is leaving bar 15 and moving toward dog 7, but in actual practice the resiliency of the cotton exerts an upward pressure against the bottom of the head of the plunger which eliminates this pause or at least causes it to be unnoticeable and negligible.

Obviously it is within the scope of my present invention to depart from the specific details of construction herein shown and described. For example the dog 7 and latch 8 may be mounted upon the chains 33 and roller 43 upon the plunger, if desired, the mode of operation of the machine remaining the same as that of the specific form of my invention above described.

What I claim is:

1. A tramper for cotton baling presses, comprising a frame; an endless chain mounted for revolution in said frame; means to continuously revolve said chain; a plunger mounted in said frame; means carried by the chain and plunger to connect the parts to lift the plunger; a stop upon the frame to disconnect the chain and plunger at a predetermined point; connecting means carried by the chain and plunger, spaced from the first connecting means to connect the parts to lower the plunger, after a predetermined idle travel of the chain.

2. A tramper for cotton baling presses comprising a plunger; a dog, movably mounted upon said plunger; a latch movably mounted upon said plunger and co-operating with said dog; a frame; an endless chain mounted on said frame and adapted to engage the dog to retract the plunger; means continuously operating said chain; means for tripping the latch to free the dog from the chain when the plunger reaches the limit of its outward movement; and means on the plunger engaged by the chain to move the plunger in the opposite direction after the plunger has remained at rest in retracted position for a period of time following the tripping of said latch.

3. A tramper for cotton baling presses comprising a vertically movable plunger; means counterbalancing the weight of said plunger; a dog movably mounted upon said plunger; a latch movably mounted upon said plunger and co-operating with said dog; a frame; an endless chain mounted on said frame and adapted to engage the dog to raise the plunger into retracted position; means continuously operating said chain; means for tripping the latch to free the dog from the chain when the plunger reaches the limit of its upward movement, and means on the plunger engaged by the chain to effect the lowering of the plunger after the latter has remained at rest for a period of time following the tripping of the latch.

4. A tramper for cotton baling presses comprising a plunger; a dog movably mounted upon said plunger; a latch movably mounted upon said plunger and co-operating with said dog; a frame; an endless chain mounted on said frame and adapted to engage the dog to retract the plunger; means continuously operating said chain; means for tripping the latch to free the dog from the chain when the plunger reaches the limit of its outward movement, and an abutment on the plunger that is engaged by the chain to move the plunger in the opposite direction after said plunger has remained at rest in retracted position for a period of time following the tripping of the latch.

5. In a tramper for cotton baling presses, comprising a frame; an actuating chain mounted for movement in said frame; means to actuate the chain; a plunger; a standard upon the plunger, constituting a stem, within the frame; an actuating element carried by the chain; an abutment bar carried by the stem and crossing the path of the actuating element on the chain; all combined to cause movement of the chain to move the plunger by contact with the abutment bar.

Signed at Atlanta, Georgia, this sixth day of July, 1920.

NELSON B. HENRY.